United States Patent
Robert et al.

(10) Patent No.: US 6,327,276 B1
(45) Date of Patent: Dec. 4, 2001

(54) CONFERENCING OVER LAN/WAN USING A HYBRID CLIENT/SERVER CONFIGURATION

(75) Inventors: Andre J. Robert, Woodlawn; R. Scott McClennon, Ottawa, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/218,142

(22) Filed: Dec. 22, 1998

(51) Int. Cl.[7] ............................. H04L 12/16; H04J 3/04; H04J 3/02

(52) U.S. Cl. .................... 370/535; 370/260; 370/537; 370/542

(58) Field of Search ................................. 370/260, 261, 370/268, 269, 270, 271, 286, 289, 535, 537, 542

(56) References Cited

U.S. PATENT DOCUMENTS

| | | | |
|---|---|---|---|
| 5,671,226 | * 9/1997 | Murakami et al. | 370/474 |
| 5,748,624 | * 5/1998 | Kondo | 370/347 |
| 5,841,763 | * 11/1998 | Leondires et al. | 370/260 |
| 6,115,689 | * 9/2000 | Malvar | 704/503 |

* cited by examiner

Primary Examiner—Wellington Chin
Assistant Examiner—Brenda H. Pham

(74) Attorney, Agent, or Firm—Foley & Lardner

(57) ABSTRACT

A method of and system for conferencing a plurality of clients over a local or wide area network using multicasting where the conferencing function is distributed between a server and the clients. The invention takes advantage of certain capabilities of existing client equipment and multicasting capabilities of the server to distribute the conference function between the server and the clients in a conference call over a LAN/WAN in a way that reduces network congestion and protocol complexity. The system of the present invention for providing conferencing over a local or wide area network, includes: a plurality of clients connected to the network for transmitting signals to and receiving signals from the network; and a server connected to the network for receiving a plurality of signals transmitted from the plurality of clients, mixing the received signals to create a single multicast signal, and transmitting the multicast signal to each of the clients. Each of the plurality of received signals is made up of data packets of a defined length. The server includes: a jitter buffer for synchronizing the data packets received from the plurality of clients; an adjustable gain/loss controller for applying adjustable gain/loss to the synchronized data packets—according to speech activity and average level at each client signal; a mixer for mixing the data packets of the plurality of signals to create the single multicast signal for transmission to each of the clients. An individual client receiving the multicast signal transmitted from the server includes an echo controller for estimating and removing, from the multicast signal, a signal component corresponding to a signal transmitted from that client.

7 Claims, 4 Drawing Sheets

CONFERENCING OVER LAN/WAN USING A HYBRID CLIENT/SERVER CONFIGURATION

FIELD OF THE INVENTION

The invention relates to the conferencing of users of a local or wide area network (LAN/WAN). Specifically, the method and system of the present invention provide for audio or other types of conferencing over a LAN/WAN using multicasting where the conferencing function is distributed between the server and the clients.

BACKGROUND OF THE INVENTION

Allowing multiple telephone users to be connected to and communicate with one another on the same call, a feature known as "conferencing", is a commonly found and popular application of traditional circuit-switched telephone networks. With the growing usage of local and wide area networks, not only for the communication of computer data, but also for the communication of voice and video, the demand has become evident for conventional circuit-switched telephony features, such as conferencing, implemented on a LAN/WAN. Various communication devices traditionally used in circuit-switched telephone networks can be used to communicate over a LAN/WAN; personal computers and telephones are but two examples. Such networks can also be connected to the Public Switched Telephone Network (PSTN) via a gateway. Many offices today are already wired for connection to a local area network. Access to wide-area networks, such as the Internet, is also available to many users. Devices have been developed to facilitate voice and video communication over such networks using a standard Internet protocol (IP).

Current methods of facilitating conferencing of users over a LAN/WAN are either client-based or server-based. In a client-based method, each of the clients in the conference call transmits their signals over the LAN/WAN to every other client involved in the conference call. Accordingly, each client in the conference call receives individual signals from all of the other clients involved in the call. The combination of the individually received signals is performed locally, at each of the receiving clients. There are certain drawbacks to the use of such a method. In general, the transmission of signals from each client to every other client in a conference call requires much network bandwidth. It also causes network congestion and delays in receipt of the data packets that make up the signals. The client-based conferencing method also requires that the clients participating in the conference call each have the functionality to combine the individually received signals, thus necessitating the use of specialized equipment at each client.

In a server-based method, the server performs the conferencing function. All of the clients involved in a conference connection transmit their individual signals to the server. The server then combines them and sends a client specific signal to each of the clients. The combined signal sent to a particular client contains the combined signals of the other clients but does not contain that particular client's own signal. As a result, those clients in a voice conference call who are not talking all receive separate but substantially similar combined signals from the server. One drawback of this method is that it results in increased network congestion and delays. Additionally, since different output streams must be generated and routed to each client of the conference call, the complexity of the network protocol is increased. An accommodation can be made at the server so that all of the "non-talking" clients in a conference call receive the same combined signal. While this alleviates some of the network congestion problems prevalent in the above-described server-based conferencing method, it tends to increase the complexity of the protocol and often provides less than adequate conferencing quality. The compositions of the groups of "talking" clients and of "silent" clients are extremely dynamic. As such, the server is constantly updating its determinations of which signals to combine at various strengths and what type of signal to provide a given client depending upon which clients are "talking" and which clients are "silent". Often, the updates are not immediate, resulting in cropped speech, erroneous mixing, etc.

SUMMARY OF THE INVENTION

Having identified the above-described problems, the inventors have developed the following solution, which is embodied in the present invention. As described herein, the present invention provides a method of and system for providing audio or other types of conferencing to a plurality of clients over a local or wide area network using multicasting wherein the conferencing function is distributed between a server and the clients. The invention takes advantage of certain capabilities of existing client equipment and multicasting capabilities of the server to distribute the conference function between the server and the clients in a conference call over a LAN/WAN in a way that reduces network congestion and protocol complexity.

The method of the present invention includes receiving, at a server within a local or wide area network, a plurality of signals from a plurality of clients in the network. Often, a signal is received from every client involved in the conference call. Those received signals are then mixed at the server to create a single multicast signal and the multicast signal is transmitted to each of the clients. The mixing of the signals at the server is performed by synchronizing the data packets, which make up each of the signals, that are received from the clients using a jitter buffer; adjusting the gain the individual synchronized data packets where necessary; and mixing the synchronized data packets of the plurality of received signals to create the single multicast signal. When a particular client receives the transmitted multicast signal, the signal component corresponding to the signal transmitted from that client is removed so that the remaining signal contains substantially no "echo" of the client's own signal.

The system of the present invention for providing conferencing over a local or wide area network, includes: a plurality of clients connected to the network for transmitting signals to and receiving signals from the network; and a server connected to the network for receiving a plurality of signals transmitted from the plurality of clients, mixing the received signals to create a single multicast signal, and transmitting the multicast signal to each of the clients. Each of the plurality of received signals is made up of data packets of a defined length. The server includes: a jitter buffer for synchronizing the data packets received from the plurality of clients; an adjustable gain/loss controller for applying adjustable gain/loss to at least one of the synchronized data packets; a mixer for mixing the data packets of the plurality of signals to create the single multicast signal for transmission to all of the clients. An individual client receiving the multicast signal transmitted from the server includes an echo controller for estimating and removing, from the multicast signal, a signal component corresponding to a signal transmitted from that client.

While reference is made throughout this disclosure of the use of the present invention to provide traditional audio conferencing over a LAN/WAN, it would be apparent to one skilled in the art that the invention has applicability in the conferencing of clients irrespective of the format of audio data contained in the signals. Accordingly, it is envisioned that the present invention has further applicability in the areas of stereo audio conferencing as well as the audio component of video conferencing.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein.

DETAILED DESCRIPTION OF THE PREFERRED EMBODIMENTS

As described herein with reference to the accompanying drawings, the present invention provides a method of and system for conferencing a plurality of clients over a local or wide area network using multicasting where the conferencing function is distributed between a server and the clients. The invention takes advantage of certain capabilities of existing client equipment and multicasting capabilities of the server to distribute the conference function between the server and the clients in a conference call over a LAN/WAN in a way that reduces network congestion and protocol complexity. The term "clients," as used in the present disclosure, can include individual user telephones, gateways, Internet Telephones, personal computers, or other devices connected to a LAN/WAN. Audio signals transmitted over a LAN/WAN are in the form of data packets of a defined length, typically corresponding to 10–30 milliseconds of digitized audio (speech), and follow a specific Internet Protocol (IP). While the preferred embodiment of the present invention is directed to the facilitation of audio conferencing over a LAN/WAN, the invention has applicability in the conferencing of clients irrespective of the type of data contained in the client signals. Accordingly, it is envisioned that the invention has further applicability in the areas of stereo audio conferencing as well as video conferencing.

Figure 1:
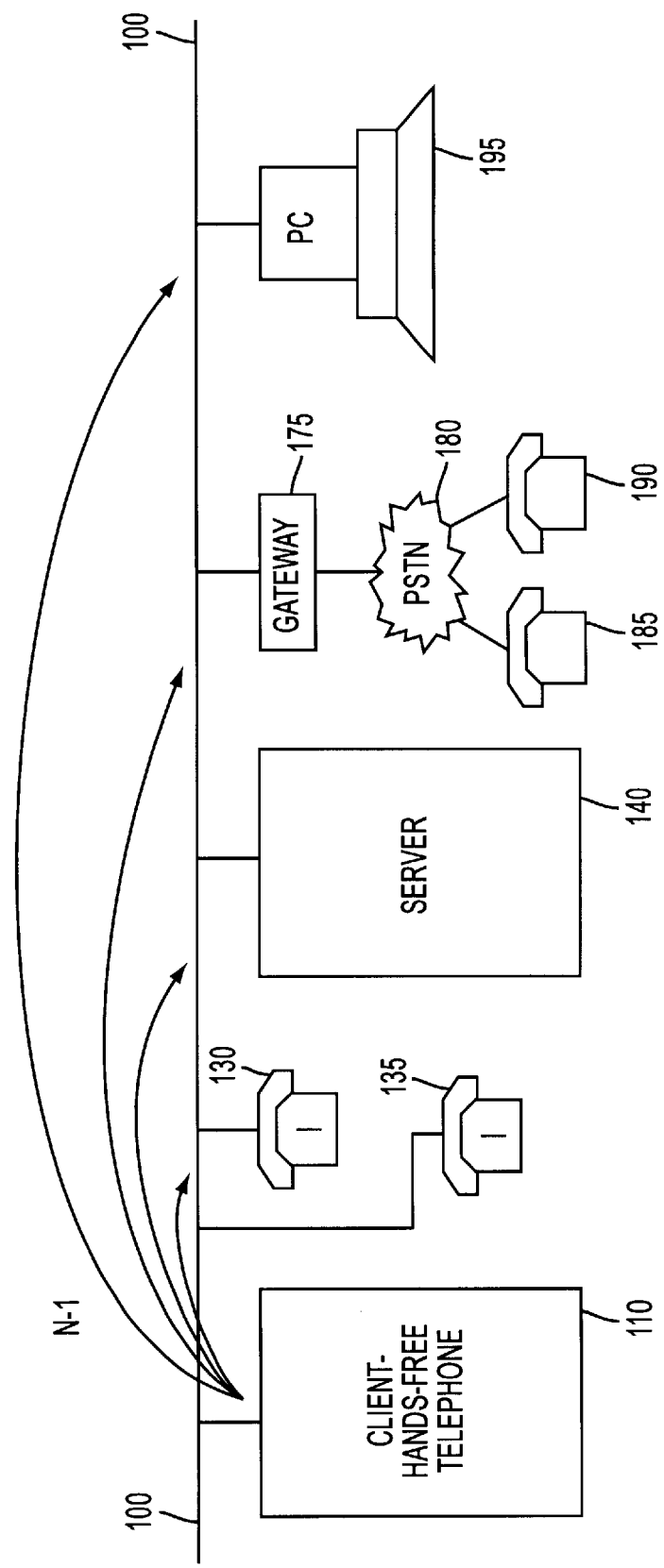
FIG. 1 is a diagram illustrating a typical client-based system for conferencing over a LAN/WAN.

FIG. 1 shows a client-based system for facilitating conferencing of users over a LAN/WAN. In a client-based system, each of the clients in the conference call transmits their signals over the LAN/WAN to every other client involved in the conference call. Accordingly, each client in the conference call receives individual signals from all of the other clients involved in the call. The combination of the individually received signals is performed locally, at each of the receiving clients. The clients shown, in FIG. 1, to be participating in a conference call include: a hands-free telephone 110, two Internet Telephones 130 and 135, and a personal computer 195. Also shown as a client is a gateway 175 for allowing connection from the LAN/WAN 100 to, and therefore conferencing of, telephones 185 and 190 from the PSTN 180. The conferencing of the users from the PSTN is performed, not locally, at the user equipment, but rather at the server 140 or at the gateway 175. For all other clients shown, conferencing is performed locally at each client from the signals received from every other client involved in the conference call. The result is that N–1 signals are received and N–1 signals are transmitted for each client involved in the conference call, where N represents the total number of clients involved in the conference. For example, the hands-free client 110 receives four different data packet streams, one from each of the other clients involved in the conference call and combines them to allow the hands-free user to hear the conferenced connection from other users. The hands-free client 110 also transmits its own signal containing the voice of the hands-free user, in four data streams shown as arrows "N–1", one to each of the other clients involved in the conference call. Similar conferencing is performed at each of the other clients.

There are serious drawbacks to the use of a purely client-based system for conferencing over a LAN/WAN as described above. Much network bandwidth is used in the transmission of signals from each client to every other client in a conference call. The result is increased network congestion and potentially increased delay in the receipt of individual data packets. Furthermore, the client-based system requires that each of the clients have the requisite equipment to receive a plurality of different signals from the different clients and to perform the mixing operation locally. Such equipment is generally not available at each client.

Figure 2:
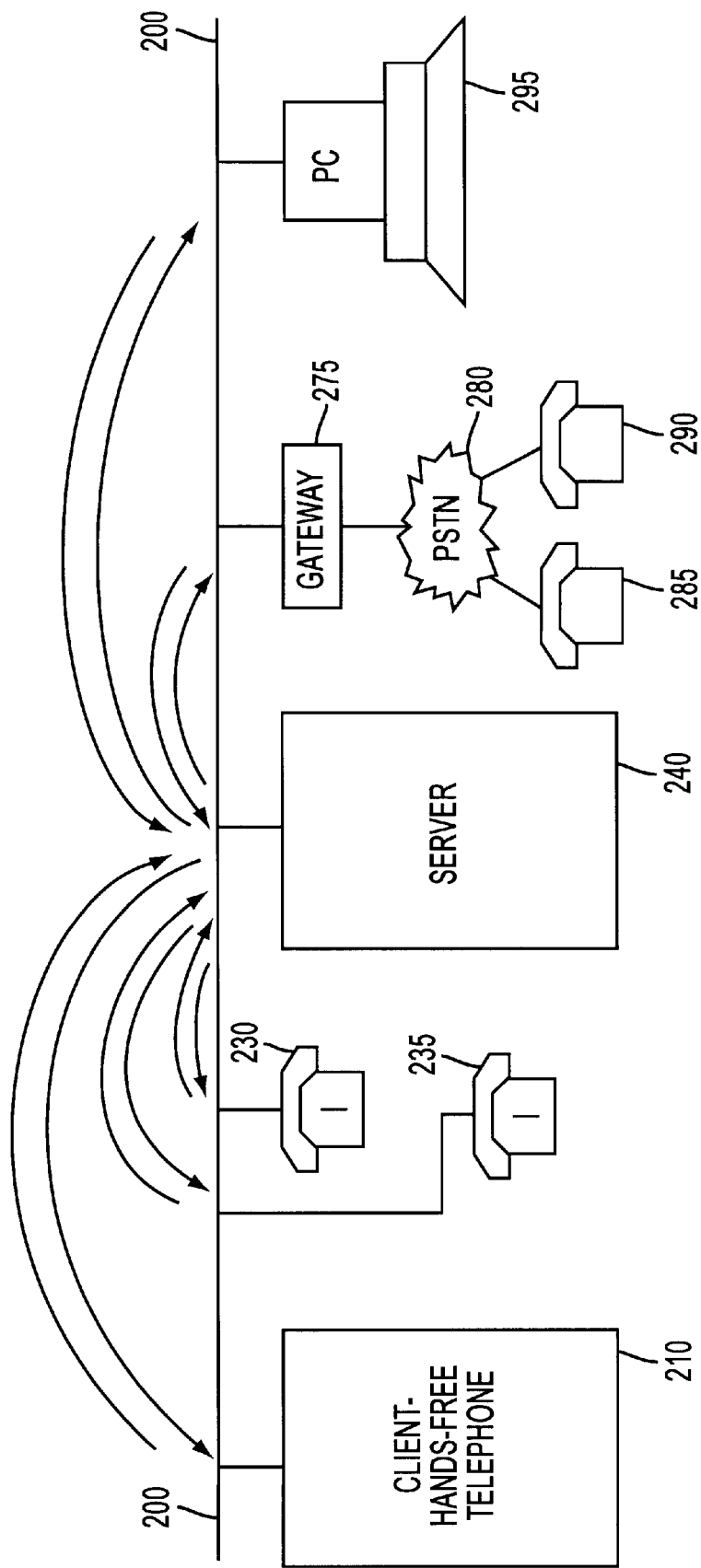
FIG. 2 is a diagram illustrating a typical server-based system for conferencing over a LAN/WAN.

FIG. 2 shows a server-based system for facilitating conferencing of users over a LAN/WAN. The clients shown, in FIG. 2, to be participating in a conference call include: a hands-free telephone 210, two Internet Telephones 230 and 235, and a personal computer 295. Also shown as a client is a gateway 275 for allowing connection from the LAN/WAN 200 to, and therefore conferencing of, telephones 285 and 290 from the PSTN 280. In such a server-based system, the conferencing function is performed entirely by the server 240. Each of the clients involved in a conference call transmits their individual signals to the server. The server then combines them with additional loss applied to the signals of inactive (not talking) participants so as to minimize additive noise in the output signals, and transmits a client specific signal to each of the clients. The signals sent to and from the server are shown as arrows in FIG. 2. The result is that N independent signals are received by the server and N independent signals are transmitted from the server to the individual clients, where N represents the total number of clients involved in the conference. This server-based design is comparable to that of an audio conference bridger in the circuit-switched network.

The combined signal sent to a particular client contains the combined signals of the other clients but does not contain that particular client's own signal. For example, the signal sent to the hands-free client 210 from the server 240 would contain the combined signals from the Internet Telephones 230 and 235, the PC 295 and the gateway 275 to the PSTN 280 connected users 285 and 290. Usually in a conference call, only one or two of the parties are speaking at any given time. The remaining parties are relatively silent. Thus, in the server-based conferencing system, at any given time only two of the signals received by the server are "active". As a result, those clients in the voice conference call who are not talking all receive separate but identical combined signals from the server.

One drawback of the server-based method this method is that it results in unnecessary network traffic, leading to possible congestion and delay. An accommodation can be made at the server so that all of the "non-active" clients in a conference call receive the same combined signal instead of client-specific signals. While this alleviates much of the network congestion problems prevalent in the above-described server-based conferencing method, it increases the complexity of the protocol and often provides less than adequate conferencing quality. The compositions of the groups of "talking" clients and of "silent" clients are extremely dynamic; talking parties can become silent and vice-versa. As such, the server is constantly updating its determinations of which signals to combine at various strengths and what type of signal to provide a given client depending upon which clients are "talking" and which clients are "silent". Often, the updates do not immediately follow the change in the status of the client (talking vs. silent), resulting in cropped speech, erroneous mixing, etc. The use of such a method essentially precludes the application of multicast and results in increased complexity of the network protocol.

The present invention takes advantage of certain capabilities of existing client equipment and multicasting capabilities of the server to distribute the conference function between the server and the clients in a conference call over a LAN/WAN. In doing so, the present invention reduces network congestion and protocol complexity. Thus, unlike the server-based and client-based systems, in the system of the present invention, both the clients and the server play important roles in performing the conferencing function over the LAN/WAN.

Figure 3:
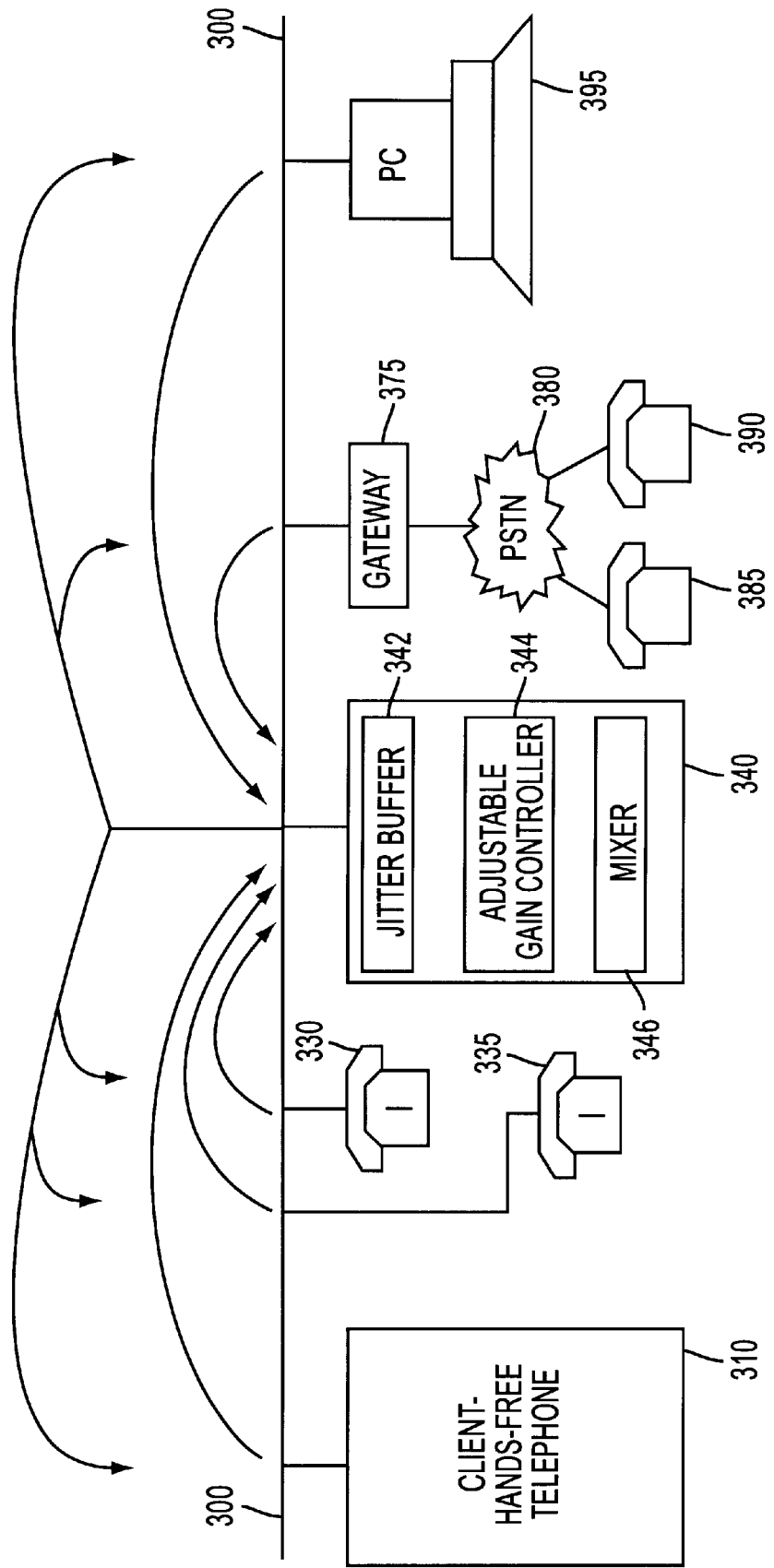
FIG. 3 is a diagram illustrating a hybrid client/server system according to the present invention for distributed conferencing over a LAN/WAN.

FIG. 3 shows a hybrid client/server system for distributed conferencing according to the present invention. The clients shown, in FIG. 3, to be participating in a conference call include: a hands-free telephone 310, two Internet Telephones 330 and 335, and a personal computer 395. Also shown as a client is a gateway 375 for allowing connection from the LAN/WAN 300 to, and therefore conferencing of, telephones 385 and 390 from the PSTN 380. Each of the clients involved in a conference call transmits their individual signals to the server 340. The individual transmit signals are then scaled and mixed at the server 340 to create a single multicast signal, which is then transmitted to each of the clients. Accordingly, each client receives the same signal. A particular client receiving the multicast signal then removes its own component from the signal and outputs the remaining signal which contains the conferenced signals of the other users in the conference call but substantially no "echo" of that particular client's output signal. In terms of network bandwidth usage, the result is that N independent signals are received by the server but only one signal is transmitted from the server to the individual clients, where N represents the total number of clients involved in the conference. The signals sent to and from the server are shown as arrows in FIG. 3.

The output signals of all of the clients involved in a conference call are received by the server 340. The server then, in a jitter buffer 342, synchronizes the data packets from the various received signals to compensate for the small variations in arrival time usually present in signals transmitted over a LAN/WAN. Those skilled in the art will appreciate that while reference is made to a jitter buffer, multiple jitter buffers may be included in or used in place of jitter buffer 342. In the preferred embodiment of the present invention, jitter buffer 342 would contain a separate jitter buffer for each client served in the conference. Once the data packets are aligned, the level of the individual signals is scaled, if necessary, as determined by the adjustable gain/loss controller 344, based on speech activity across all client signals and average speech level. Scaling is performed to equalize signals of clients who, at a given time, are determined to be "active" or talking and to suppress noise from clients who, at a given time, are determined to be silent. The scaled signals are then combined in a mixer 346 to create a single multicast signal. The multicast signal is then transmitted over the LAN/WAN 300 to all of the clients involved in the conference call. In the preferred embodiment of the invention, changes in the scale factor (gain/loss) applied to individual client signals are made on packet boundaries. This simplifies the operation of the echo cancellers at the client receivers.

Figures 4A, 4B:
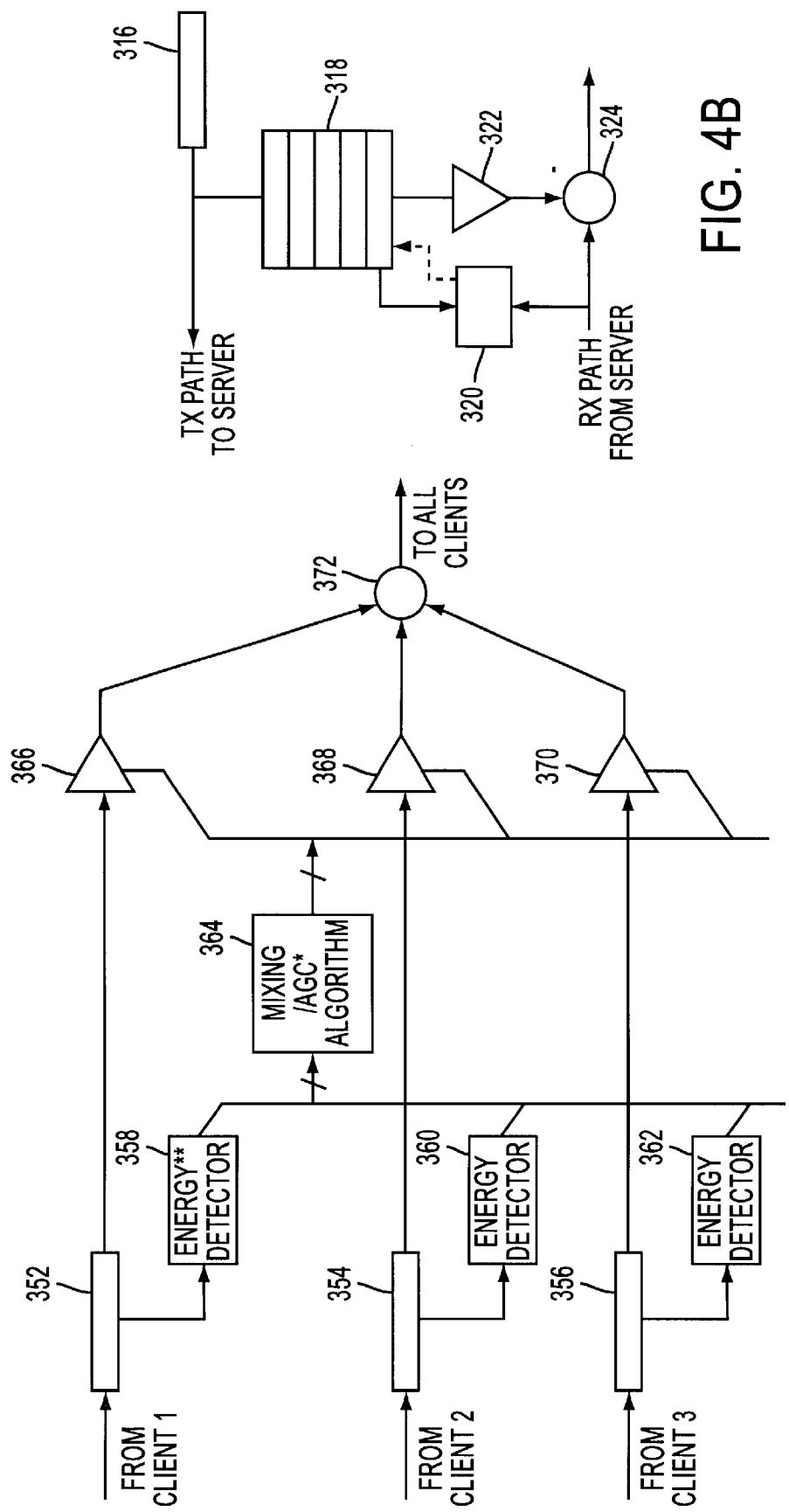
FIG. 4a is a diagram illustrating the signal flow at a server in the distributed conferencing system of the present invention.
FIG. 4b is a diagram illustrating the signal flow at a client in the distributed conferencing system of the present invention.

FIG. 4a shows a functional diagram of the operation of the server 340 under the present invention where the server receives signals from three different clients. The use of signals from three clients is shown for purposes of example and not limitation. Buffers 352, 354 and 356 receive and hold samples of the signals received from client 1, client 2 and client 3. Energy detectors 358, 360 and 362 are connected to these buffers and sample the signals therein to determine the energy level present. This information regarding each of the client signals is provided to the mixing and automatic gain control algorithm 364, which, in FIG. 3, is performed in the Adjustable Gain/Loss Controller 344. The algorithm controls the gain/loss applied by the variable amplifiers 366, 368 and 370 to the individual data packets of the signals from the clients. The energy detectors, thus, also provide information for identifying which one or more clients are talking at a given time and which ones are silent. Based upon the information from the energy detectors, the gain applied to the individual signals is controlled to minimize the variation of the signal levels between different talkers. Also based upon the information from the energy detectors, the gain applied to the signals from the clients who, at a given time, are not talking, can be adjusted such that the noise from those signals is suppressed. The adjusted signals are then mixed at 372 to create a multicast signal for transmission to all of the clients in the conference call.

The multicast signal received at a particular client contains the combined output signals of all of the clients involved in the conference call, including that of the particular client. For example, referring again to FIG. 3, the signal sent to the hands-free client 310 from the server 340 would contain the combined signals from the Internet Telephones 330 and 335, the personal computer 395, the gateway 375 to the PSTN 380 connected telephones 385 and 390 in addition to the output signal from the hands-free client 310. The output signal of the hands-free client 310 is returned as an "echo" in the multicast signal with a certain amount of delay and at a different signal level as determined by the gain controller in the server. Once a multicast signal is received at a particular client, that client will perform echo cancellation to substantially eliminate its own component of the multicast signal.

FIG. 4b shows a functional diagram of the operation of a given client, for example the hands-free client 310, under the present invention. A buffer 316 is used to packetize the signal to be transmitted to the LAN/WAN. A delay line 318 samples each packet of the transmitted signal and holds it for a finite amount of time approximately equal to the amount of delay that is introduced by the network. A cross correlator 320 is connected between the taps of the delay line 318 and the receive path of the client containing the received multicast signal. The cross correlator 320 is used to determine both the tap of the delay line 318 which matches the roundtrip delay after the client's echo signal, and the gain/loss introduced in that echo path by the adjustable gain controller. The echo is then estimated by tapping off the delay line at the calculated point and applying the estimated matching gain/loss at the amplifier 322. The resulting estimated echo is then subtracted, at subtractor 324, from the multicast signal, substantially eliminating the client's own echo.

Use of the hybrid client/server distributed conferencing system for providing conferencing over a LAN/WAN as described herein alleviates many of the problems facing purely client-based and strictly sever-based conferencing systems. Compared to those systems, the system of the present invention requires less network bandwidth, reducing network congestion and delays in the receipt of data packets. Splitting the conferencing function between the server and the clients allows the server operating in a multicast mode to transmit one signal instead of multiple signals. In addition, since different output streams need not be generated for the different client involved in a conference call, the complexity of the network protocol is reduced. Furthermore, it takes advantage of signal processing capabilities in client equipment which, in most cases, already exists for speech compression purposes. Only a simple receive jitter buffer is needed at a receiving client; no specialized equipment is needed since no mixing of the signals from different clients is performed at the receiving client.

It is intended that the invention, as described herein, includes all variations and modifications as fall within the scope of the claims and equivalents thereof.

What is claimed is:

1. A method of conferencing a plurality of clients in a local or wide area network (LAN/WAN), said method comprising:
    receiving, at a server within said network, a plurality of signals from said plurality of clients in said network;
    mixing said signals at the server to create a single multicast signal; and
    transmitting said multicast signal to each of said plurality of clients in said network,
    wherein said plurality of signals comprise data packets of a defined length and wherein the step of mixing said signals at the server comprises:
        synchronizing data packets received from said plurality of clients using a jitter buffer;
        adjusting gain/loss for at least one of said synchronized data packets; and
        mixing said data packets of said plurality of signals to create the single multicast signal.

2. A method of conferencing a plurality of clients in a local or wide area network (LAN/WAN), said method comprising:
    receiving, at a server within said network, a plurality of signals from said plurality of clients in said network;
    mixing said signals at the server to create a single multicast signal;
    transmitting said multicast signal to each of said plurality of clients in said network;
    receiving said multicast signal at one of said plurality of clients; and
    removing from said multicast signal, at said one of said plurality of clients, a signal component corresponding to a signal transmitted from said one of said plurality of clients,
    wherein said plurality of signals comprise data packets of a defined length and wherein the step of mixing said signals at the server comprises:
        synchronizing data packets received from said plurality of clients using a jitter buffer;
        adjusting gain/loss for at least one of said synchronized data packets; and
        mixing said data packets of said plurality of signals to create the single multicast signal.

3. A method of conferencing a plurality of clients in a local or wide area network (LAN/WAN) as recited in claim 2 wherein said plurality of signals represent audio signals and said conferencing is an audio conferencing.

4. A method of conferencing a plurality of clients in a local or wide area network (LAN/WAN) as recited in claim 3 wherein said audio signals are in stereo and said conferencing is a stereo audio conferencing.

5. A method of conferencing a plurality of clients in a local or wide area network (LAN/WAN) as recited in claim 2 wherein said plurality of signals represent video signals and said conferencing is a video conferencing.

6. A system for providing conferencing to a plurality of clients in a local or wide area network (LAN/WAN), said system comprising:
    a plurality of clients connected to said network for transmitting signals to and receiving signals from said network; and
    a server connected to said network for receiving a plurality of signals transmitted from said plurality of clients in said network, mixing said plurality of signals to create a single multicast signal, and transmitting said multicast signal to each of said plurality of clients in said network,
    wherein said plurality of signals comprise data packets of a defined length and wherein said server comprises:
        a jitter buffer for synchronizing data packets received from said plurality of clients;
        an adjustable gain/loss controller for applying adjustable gain/loss to at least one of aid synchronized data packets; and
        a mixer for mixing said data packets of said plurality of signals to create the single multicast signal for transmission to each of said plurality of clients in said network.

7. A system for providing conferencing to a plurality of clients in a local or wide area network (LAN/WAN), said system comprising:
    a plurality of clients connected to said network for transmitting signals to and receiving signals from said network; and
    a server connected to said network for receiving a plurality of signals transmitted from said plurality of clients in said network, mixing said plurality of signals to create a single multicast signal, and transmitting said multicast signal to each of said plurality of clients in said network,
    wherein said plurality of clients receive said multicast signal transmitted from the server and wherein at least one of said plurality of clients further comprises an echo controller for removing, from said multicast signal, a signal component corresponding to a signal transmitted from said at least one of said plurality of clients, and wherein said plurality of signals comprise data packets of a defined length and wherein said server comprises:

a jitter buffer for synchronizing data packets received from said plurality of clients;

an adjustable gain/loss controller for applying adjustable gain/loss to at least one of aid synchronized data packets; and a mixer for mixing said data packets of said plurality of signals to create the single multicast signal for transmission to each of said plurality of clients in said network.

* * * * *